US010308903B2

(12) United States Patent
Mitchell

(10) Patent No.: US 10,308,903 B2
(45) Date of Patent: Jun. 4, 2019

(54) FOAM REDUCING DEVICE

(71) Applicant: PicoBrew, LLC, Seattle, WA (US)

(72) Inventor: James B. Mitchell, Seattle, WA (US)

(73) Assignee: PicoBrew, Inc., Seattle, WA (US)

( * ) Notice: Subject to any disclaimer, the term of this patent is extended or adjusted under 35 U.S.C. 154(b) by 629 days.

(21) Appl. No.: 14/489,459

(22) Filed: Sep. 17, 2014

(65) Prior Publication Data

US 2016/0075979 A1    Mar. 17, 2016

(51) Int. Cl.
B01D 19/02    (2006.01)
C12C 7/24     (2006.01)
C12C 11/11    (2019.01)
C12C 7/20     (2006.01)
C12C 7/26     (2006.01)
C12C 13/00    (2006.01)

(52) U.S. Cl.
CPC ............... C12C 7/24 (2013.01); C12C 7/20 (2013.01); C12C 7/26 (2013.01); C12C 11/11 (2013.01); C12C 13/00 (2013.01)

(58) Field of Classification Search
None
See application file for complete search history.

(56) References Cited

U.S. PATENT DOCUMENTS 941,009 A      11/1909  Cauchois
2,547,481 A     4/1951  McDonald
2,761,200 A     9/1956  Arnett
2,830,528 A     4/1958  Arnett
2,948,351 A  *  8/1960  Phillips .................. B01D 19/02
                                                    122/489
3,057,726 A    10/1962  Teignmouth
(Continued)

FOREIGN PATENT DOCUMENTS

DE    202012103852 U1   11/2012
GB         1444344 A     7/1976
(Continued)

OTHER PUBLICATIONS

Aurora Haley, "Icon Usability" published Jul. 27, 2014, Nielsen Norman Group, 8 pages.
(Continued)

Primary Examiner — Amber R Orlando
Assistant Examiner — Phillip Y Shao
(74) Attorney, Agent, or Firm — Russell S. Krajec; Krajec Patent Offices, LLC

(57) ABSTRACT

A foam reducing device may impart a mechanical shear flow to a foam and may dispense an anti-foam agent. The device may reduce highly aerated foam into a dense foam or a liquid, and may significantly reduce the volume of material. One version of the device may have an inlet tube with a nominal diameter or dimension, where the inlet tube transitions to a pair of surfaces that are close together. The foam passes through the pair of surfaces causing flow with a high a mechanical shear. A mesh material may be present between the surfaces, and the mesh material may be treated with an anti-foam agent, such as silicone, which may further reduce the volume of foam. A catch basin may collect the reduced foam for disposal. The pair of surfaces may be configured with a weight or spring to move with respect to each other during periods of high flow.

14 Claims, 3 Drawing Sheets

(56) References Cited

U.S. PATENT DOCUMENTS

| | | | |
|---|---|---|---|
| 3,102,813 A | | 9/1963 | Teignmouth et al. |
| 3,232,211 A | | 2/1966 | O'malley |
| 3,563,157 A | | 2/1971 | Lenz |
| 3,683,790 A | | 8/1972 | Jr et al. |
| 3,759,483 A | | 9/1973 | Baxter |
| 3,984,326 A | | 10/1976 | Bendel |
| 4,054,523 A | * | 10/1977 | Ingenito ............... B01D 19/02 210/188 |
| 4,362,539 A | * | 12/1982 | Nelson ................. B01D 19/02 210/242.1 |
| 4,373,024 A | * | 2/1983 | Hunt ..................... B01D 19/02 435/295.1 |
| 4,441,406 A | | 4/1984 | Becker et al. |
| 4,503,502 A | | 3/1985 | Chapin |
| 4,552,060 A | | 11/1985 | Redl et al. |
| 4,557,186 A | | 12/1985 | Brown |
| 4,751,875 A | | 6/1988 | Wooten |
| 4,754,696 A | | 7/1988 | Sarazen et al. |
| 4,754,698 A | | 7/1988 | Naish |
| 4,790,239 A | | 12/1988 | Hewitt |
| 4,846,969 A | * | 7/1989 | Ordelheide ........... B01D 19/02 210/221.2 |
| 5,158,793 A | | 10/1992 | Helbling |
| 5,265,518 A | | 11/1993 | Reese et al. |
| 5,311,811 A | | 5/1994 | Kuzyk |
| 5,413,566 A | | 5/1995 | Sevrain et al. |
| 5,865,093 A | | 2/1999 | Wasmuht et al. |
| 5,868,062 A | | 2/1999 | Enomoto |
| 5,906,151 A | | 5/1999 | Firestone et al. |
| 5,922,191 A | * | 7/1999 | Mata ..................... B01D 19/02 203/20 |
| 5,970,846 A | | 10/1999 | Roehr |
| 6,032,571 A | | 3/2000 | Brous et al. |
| 6,276,264 B1 | | 8/2001 | Dumm |
| 6,475,537 B1 | | 11/2002 | King et al. |
| 6,629,490 B1 | | 10/2003 | Lu et al. |
| 6,666,967 B1 | * | 12/2003 | Oyabu ............... B01D 19/0005 210/218 |
| 7,963,213 B1 | | 6/2011 | Murdock |
| 8,141,477 B2 | | 3/2012 | Broderick |
| 8,993,273 B1 | | 3/2015 | Blichmann |
| 9,102,908 B1 | | 8/2015 | Mitchell et al. |
| 9,109,192 B1 | | 8/2015 | Mitchell et al. |
| 9,228,163 B1 | | 1/2016 | Mitchell et al. |
| 9,376,653 B1 | | 6/2016 | Mitchell et al. |
| 9,688,949 B2 | | 6/2017 | Mitchell et al. |
| 9,932,547 B2 | | 4/2018 | Mitchell et al. |
| 2001/0035097 A1 | | 11/2001 | Shaanan et al. |
| 2002/0029694 A1 | | 3/2002 | Wong |
| 2003/0019031 A1 | | 1/2003 | Mosis |
| 2003/0153059 A1 | | 8/2003 | Pilkington et al. |
| 2005/0011364 A1 | | 1/2005 | Chen et al. |
| 2005/0103213 A1 | | 5/2005 | Dumm |
| 2005/0160917 A1 | | 7/2005 | Gantt et al. |
| 2008/0000357 A1 | | 1/2008 | Yang et al. |
| 2008/0282897 A1 | | 11/2008 | Webster et al. |
| 2009/0007796 A1 | | 1/2009 | Ricotti |
| 2009/0229471 A1 | | 9/2009 | Lun et al. |
| 2009/0246341 A1 | | 10/2009 | Pitner et al. |
| 2010/0064900 A1 | | 3/2010 | Reyhanloo |
| 2010/0107887 A1 | | 5/2010 | Bentley et al. |
| 2010/0236949 A1 | | 9/2010 | Vacca et al. |
| 2010/0313765 A1 | | 12/2010 | Hale |
| 2011/0246091 A1 | | 10/2011 | Fedele |
| 2011/0268846 A1 | | 11/2011 | Nair et al. |
| 2012/0310413 A1 | | 12/2012 | Bluck et al. |
| 2013/0202487 A1 | | 8/2013 | Gorelik et al. |
| 2014/0017354 A1 | | 1/2014 | Joseph et al. |
| 2014/0092706 A1 | * | 4/2014 | Ishii ..................... B01F 9/0001 366/218 |
| 2014/0234482 A1 | | 8/2014 | Kempfert |
| 2014/0287129 A1 | | 9/2014 | Hutcheson et al. |
| 2015/0000530 A1 | | 1/2015 | Mitchell et al. |
| 2015/0000531 A1 | | 1/2015 | Mitchell et al. |
| 2015/0000532 A1 | | 1/2015 | Mitchell et al. |
| 2015/0161871 A1 | | 6/2015 | Kim |
| 2015/0257573 A1 | | 9/2015 | Gabara |
| 2016/0075979 A1 | | 3/2016 | Mitchell |
| 2016/0272927 A1 | | 9/2016 | Mitchell |
| 2016/0272928 A1 | | 9/2016 | Mitchell |
| 2017/0022462 A1 | | 1/2017 | Mitchell et al. |
| 2017/0029752 A1 | | 2/2017 | Mitchell et al. |
| 2017/0051236 A1 | | 2/2017 | Mitchell |
| 2017/0130177 A1 | | 5/2017 | Geiger |
| 2017/0130178 A1 | | 5/2017 | Mitchell |
| 2017/0321810 A1 | | 11/2017 | Geiger |
| 2018/0057778 A1 | | 3/2018 | Mitchell |
| 2018/0171273 A1 | | 6/2018 | Mitchell et al. |

FOREIGN PATENT DOCUMENTS

| | | |
|---|---|---|
| WO | 2015173037 A1 | 11/2015 |
| WO | 2016057981 A1 | 4/2016 |

OTHER PUBLICATIONS

BeerSmith 2 (www.youtube.com/watch?v=68t9_IK-4vY) published Jun. 5, 2011 and accessed Mar. 5, 2018.

BeerTools Pro 1.5 Brewing Software in (www.youtube.com/watch?v=REgYNF_3SZc) published online Mar. 21, 2011 and accessed Mar. 5, 2015.

International Search Report, Intellectual Property Office of Singapore, PCT/IB2017/052677, dated Feb. 8, 2017.

Written Opinion of ISA, Intellectual Property Office of Singapore, PCT/IB2017/052677, dated Feb. 8, 2017.

Jeff Flowers, How to Raise the ABV of Your Homebrew, May 1, 2014, https://learn.kegerator.com/raising-abv/ (accessed Mar. 1, 2018), pp. 1-10.

Ken Schwartz, Son of Fermentation Chiller or, "Better Late than Never . . . ", pp. 1-14, 1997.

Vinepair, Tasting Beer—The Role of Alcohol by Volume (ABV) https://vinepair.com/beer-101/tasting-beer-the-role-of-alcohol-by-volume-abv/ (accessed Mar. 1, 2018), pp. 1-5.

* cited by examiner

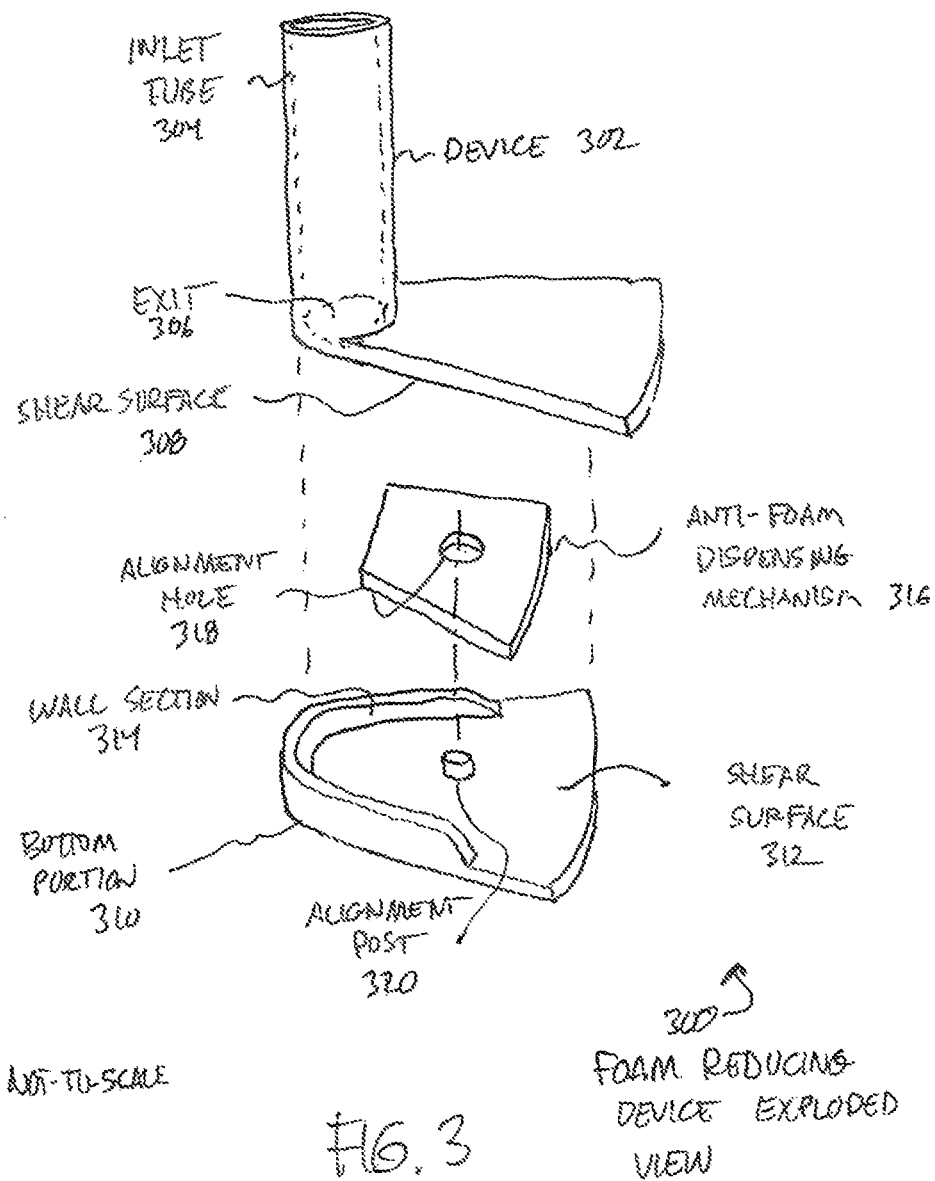

FOAM REDUCING DEVICE

BACKGROUND

Many liquid processing mechanisms cause a liquid to foam. In many cases, such as beer making, foaming may occur during various steps of making and cooling wort, as well as fermentation. Foam may be an undesirable byproduct of a processing step or may be a desirable outcome where the foam may separate and transport undesirable components away from a desired component.

Foam may contain a large amount of gas and, over time, may collapse into a relatively small amount of liquid.

SUMMARY

A foam reducing device may impart a mechanical shear flow to a foam and may dispense an anti-foam agent. The device may reduce highly aerated foam into a dense foam or a liquid, and may significantly reduce the volume of material. One version of the device may have an inlet tube with a nominal diameter or dimension, where the inlet tube transitions to a pair of surfaces that are close together. The foam passes through the pair of surfaces causing flow with a high a mechanical shear. A mesh material may be present between the surfaces, and the mesh material may be treated with an anti-foam agent, such as a silicone based anti-foam agent, which may further reduce the volume of foam. A catch basin may collect the reduced foam for disposal. The pair of surfaces may be configured with a weight or spring to move with respect to each other during periods of high flow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 1 is not to scale.

FIG. 2 is not to scale.

FIG. 3 is a diagram illustration of another embodiment showing a foam reducing device with flow from top to bottom. FIG. 3 is not to scale.

DETAILED DESCRIPTION

Figure 1:
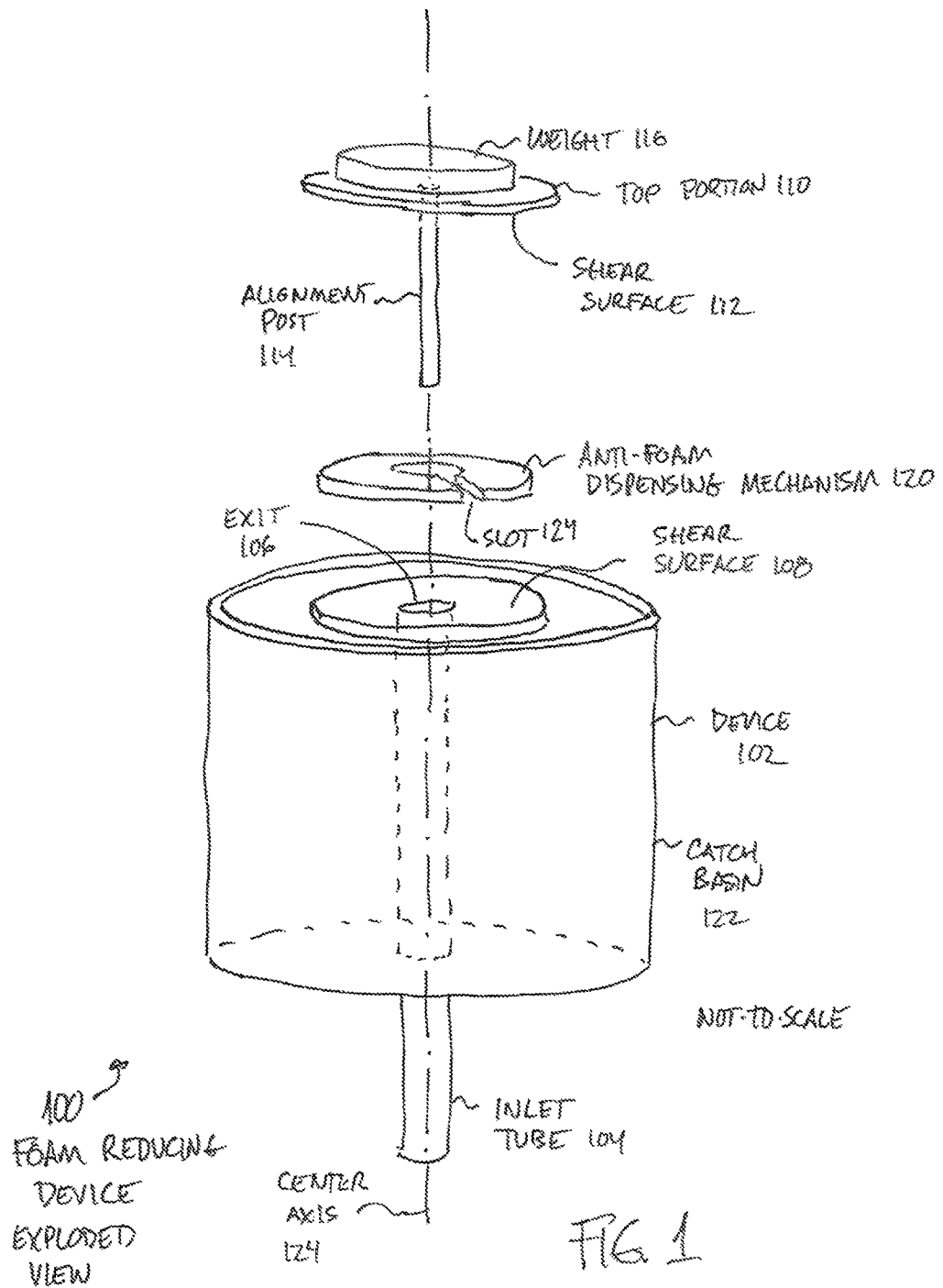
FIG. 1 is a diagram illustration of an embodiment showing a foam reducing device in a perspective view.

A foam reducing device may apply high shear flow and an anti-foam agent to a foam, causing foam that may have a high amount of gas to be reduced to a lower amount of gas. In many situations, the device may reduce highly aerated foam which may be light and fluffy, to a much more dense and lower volume foam or even to a liquid.

One use case for such a device may be during a beer making process, such as during wort production and chilling, as well as during fermentation. Some wort producing processes may aerate the wort at different stages of manufacturing, which may cause the wort to foam. Examples of such stages may be the hot break that may occur during a boil step of wort manufacture, as well as the cold break that may occur while cooling the wort prior to pitching yeast.

A foam reducing device may have an inlet that may receive foam. The foam may be passed between two surfaces that may be narrowly spaced apart. The spacing may cause the foam to flow with a high mechanical shear. It is believed that the high mechanical shear may have the effect of mechanically overcoming the surface tension of bubbles in the foam and causing the entrained gas to be released, thereby reducing the volume of the foam.

The two surfaces may be configured to have some force applied between the surfaces, such that the surfaces may separate during periods of high flow or high inlet pressures. The force may be applied using gravity, springs, or other mechanism. Such a feature may allow for intermittent high flow situations without causing high pressure build up.

The surfaces may be arranged as two annular surfaces where the foam may be introduced in the center and may flow outward between the two surfaces. The surfaces may be flat, conical, or have some other shape. In many cases, the two surfaces may be offset from each other and may be substantively parallel.

The device may have a mechanism for distributing an anti-foam agent to the foam. The anti-foam agent may reduce the foam's capacity for maintaining surface tension and may thereby cause bubbles within the foam to collapse and further reduce the volume of the foam.

The anti-foam agent may be distributed by passing the foam through a tortuous material that may be treated with the anti-foam agent. The tortuous material may be a sponge, woven or non-woven material, mesh, or other material. The material may be placed between the two surfaces that may cause the high shear flow, and may further enhance the shear applied to the foam. In some cases, the anti-foam agent may be placed in a reservoir, groove, or other holding area and dispensed as the foam passes across the holding area.

A foam reducing device may have a catch basin that may receive the reduced foam that passes between the two surfaces. The catch basin may have a drain that may collect the reduced foam and transport the reduced foam. In some cases, the catch basin may be removable for disposing the reduced foam.

One version of a foam reducing device may have an inlet tube that receives foam from the bottom and emits foam on the top. A first surface may be a ring or cone rigidly attached at the top of the inlet tube, such that the foam may pass upward and outward across the first surface. A second surface may be positioned above the first surface, and may rest against the first surface by weight of gravity. The second surface may be positioned using a positioning post that may protrude into the inlet device. A mesh ring may be placed between the surfaces, and the mesh ring may contain an anti-foaming agent. A catch basin may be attached to the inlet tube and may catch reduced foam that may pass through the surfaces and the mesh ring.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

FIG. 1 is a diagram illustration of an embodiment 100 showing an example device 102 for reducing foam. The illustration is not to scale, and is shown in an exploded view to illustrate some of the various components.

The device 102 may have an inlet tube 104 that may receive foam. The foam may be any liquid/gas combination that entraps a gas within a liquid. In the beermaking arts, foam may be produced during different phases of wort manufacture, as well as during fermentation.

During wort manufacture, foam may be produced during hot break and cold break steps. Such foam may tend to have relatively large, airy bubbles, and may sometimes be produced in large volumes, depending on the wort manufacturing apparatus.

The foam may enter the inlet tube 104 and travel upwards to an exit 106. The foam may pass between a shear surface 108 and a second shear surface 112 that may be part of a top portion 110 of the device 102. It is thought that as the foam passes between the shear surfaces 108 and 112, the bubbles in the foam may be reduced through mechanical shearing.

The top portion 110 may have an alignment post 114 that may rest inside the inlet tube 104, and may have a weight 116 that may apply some force between the two shear surfaces 108 and 112. The top portion 110 may use gravity to apply such a compressive force between the shear surfaces, although other embodiments may use springs or other force-producing mechanisms to apply force.

The top portion 110 may be movable such that during periods of very high flow, the top portion 110 may rise up and allow the foam to pass when the foam exceeds the compressive force that may be present due to the weight 116. Such a feature may be useful to avoid excessive pressure build up in a vessel in which foam may be produced.

An anti-foam dispensing mechanism 120 may be placed between the two shear surfaces 108 and 112. The anti-foam dispensing mechanism 120 may be a woven or non-woven material that may be impregnated with an anti-foam agent. Such an agent may be applied to the anti-foam dispensing mechanism 120 prior to use, and it is believed that such an agent may further cause bubbles in the foam to collapse during use.

The anti-foam dispensing mechanism 120 may contain a slot 124 or other channel that may allow small amounts of foam to pass through the shear surfaces 108 and 112 without passing through the anti-foam dispensing mechanism 120. Such a slot 124 may allow low volumes of foam to pass through the device 102 with a minimum of back pressure being applied.

In many processes, including beermaking and wort manufacture, foam may be carry undesirable materials out of the process. In the case of wort manufacture, some foam may contain volatile materials that may cause undesirable flavors in the finished product, and it has been shown that by causing the foam to escape, such undesirable flavors may be at least partially avoided.

Figure 2:
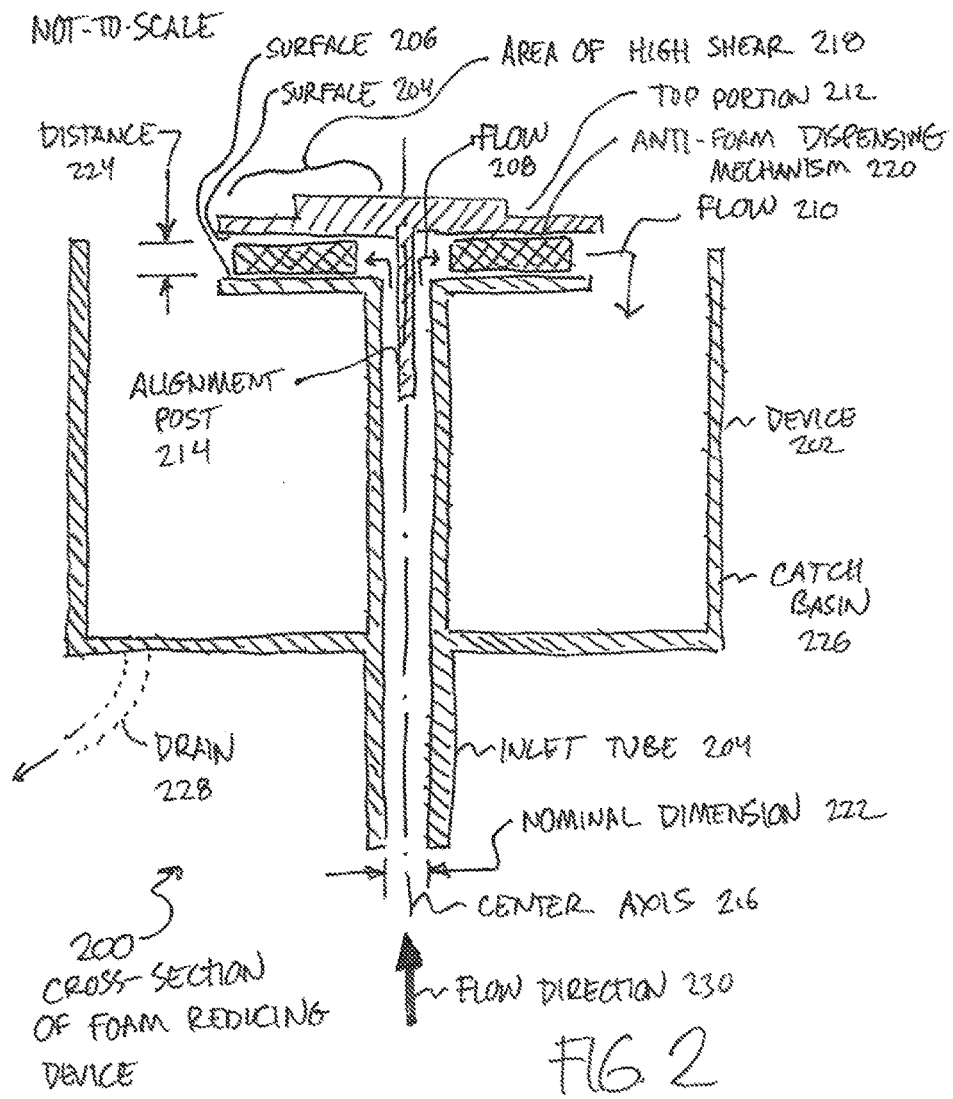
FIG. 2 is a diagram illustration of an embodiment showing a cross-sectional view of a foam reducing device.

FIG. 2 is a diagram illustration of an example embodiment 200 showing a cross-sectional view of a foam reducing device similar to that illustrated in embodiment 100. Embodiment 200 is drawn not to scale such that the various concepts within the device may be more clearly illustrated.

Embodiment 200 may illustrate a device 202 that may be defined by a revolution about a center axis 216. Device 102 of embodiment 100 may be one such example.

Foam may flow upwards 230, through the inlet tube 204 then turn at an exit or transition point 208, pass between the shear surfaces 204 and 206, and flow out 210 into the catch basin 226.

The foam may pass between the shear surfaces 204 and 206, which may have the effect of mechanically breaking bubbles in the foam. The foam may also pass through an anti-foam dispensing mechanism 220, which may dispense an anti-foaming agent.

An area of high shear 218 may be the area between the shear surfaces 204 and 206 where the distance 224 between the shear surfaces 204 and 206 may have some effect on breaking bubbles in foam. The inlet tube 204 may have a nominal dimension 222 that may be substantially larger than the distance 224.

In many embodiments, an inlet tube 204 may be circular and have a nominal dimension 222 that may be a diameter. In embodiments where the inlet tube 204 may be square, rectangular, or have some other shape, the nominal dimension 222 may be the smallest cross-sectional dimension of the inlet tube 204.

The nominal dimension 222 may be substantially larger than the distance 224. The ratio between the two dimensions may be 1.25:1, 1.5:1, 2:1, 4:1, 5:1, 10:1, 100:1, or greater. In embodiments where an anti-foam dispensing mechanism 220 may not be present, the shear surfaces 204 and 206 may be in contact when there is minimum or no flow, and therefore the ratio between the two dimensions may be infinite.

Such a design may allow foam to flow through the inlet tube 204 with less impedance than in the area of high shear 218, where the area of high shear 218 may produce much more impedance in a narrow distance and thereby cause the foam to at least partially collapse.

The catch basin 226 may capture the output of the flow 210. In many cases, the foam may further reduce in the catch basin 226, especially when an anti-foam agent may have been applied to the foam with the anti-foam dispensing mechanism 220. In some cases, the catch basin 226 may have a drain 228, which may carry away the contents of the catch basin 226.

The cross-section of embodiment 200 may illustrate the assembled elements of embodiment 100. The top portion 212 may be located in the inlet tube 204 with the alignment post 214. The top portion 212 may be held by gravity and may be prevented from moving by the alignment post 214. During periods of very high flow, the top portion 212 may be pushed up, thereby increasing the distance 224 between the shear surfaces 204 and 206.

In many embodiments, the catch basin 226 may have a vertical side wall that may be at or above the height of the surface 204. Such a design may be useful in cases where the foam flow may be erratic. A burst of foam entering the device 202 may gush out of the area of flow 210 and may spray in some cases.

FIG. 3 is a diagram illustration of an example embodiment 300 showing a foam reducing device 302 where flow enters the device from the top. The example of embodiment 300 is also merely one example of a foam reducing device which is not a revolution about a center axis. The example of embodiment 100 illustrated a device that was round, while the example of embodiment 300 is an example of a device that is not.

Embodiment 300 illustrates a foam reducing device that may be made up of three elements: an upper element that contains an inlet tube 304, an exit 306, and an upper shear surface 308. In the illustration, the upper shear surface 308 is hidden from the viewer. A lower element or bottom portion 310 may have a lower shear surface 312 and a wall section 314. An anti-foam dispensing mechanism 316 may be placed between the two shear surfaces 308 and 312.

The anti-foam dispensing mechanism 316 may be retained by an alignment hole 318 that may engage an alignment post 320 on the bottom portion 310.

The upper portion and the bottom portion 310 may be rigidly attached to each other, or may be attached such that the portions may move with respect to each other. Rigidly attached embodiments may be created by snap fitting the two components together, bonding the components using welding, adhesives, or other bonding mechanisms, as well as by molding the components together as a single, rigid part.

The upper portion and the bottom portion 320 may be movably attached using springs, levers, or other mechanisms that may allow the bottom portion 320 to flex or move away from the upper portion during periods of high flow.

The anti-foam dispensing mechanism 316 may be removable or permanently affixed to the device 302.

The flow of the device 302 may have foam enter the device 302 from the top, then transition to a high shear flow between the shear surfaces 308 and 312. The flow may pass across the shear surfaces and out of the device. A collection mechanism may be used to collect and dispose of the reduced foam, but such a mechanism is not illustrated in embodiment 300.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A foam reducing apparatus comprising: an inlet port having an inlet nominal cross sectional dimension;
    a first surface and a second surface defining a foam flow path,
    said first surface is a continuous surface which is separate and distinct from the second surface,
    said first continuous surface and said second surface being parallel to each other and connected to said inlet port at a first end;
    said first continuous surface and said second surface having an exit end;
    said first continuous surface and said second surface having at least one cross section between them having a minimum cross sectional dimension that is less than said inlet nominal cross sectional dimension.

2. The foam reducing apparatus of claim 1, said inlet nominal cross sectional dimension being at least three times said minimum cross sectional dimension.

3. The foam reducing apparatus of claim 2, said inlet nominal cross sectional dimension being at least ten times said minimum cross sectional dimension.

4. The foam reducing apparatus of claim 3, said inlet nominal cross sectional dimension being at least twenty times said minimum cross sectional dimension.

5. The foam reducing apparatus of claim 1, said foam flow path defining a path length at least three times said inlet nominal cross sectional dimension.

6. The foam reducing apparatus of claim 5, said foam flow path defining a path length at least ten times said inlet nominal cross section dimension.

7. The foam reducing apparatus of claim 1, said second surface being movable with respect to said first continuous surface in a direction defined by said minimum cross sectional dimension.

8. The foam reducing apparatus of claim 7, said second surface being configured to apply at least some force in said direction defined by said minimum cross section dimension.

9. The foam reducing apparatus of claim 8, said force being applied at least in part from gravity when said foam reducing apparatus is positioned in a normal use position.

10. The foam reducing apparatus of claim 8 further comprising a spring disposed to apply at least a portion of said force.

11. The foam reducing apparatus of claim 1 further comprising an anti-foam delivery mechanism comprising a porous medium treated with an anti-foam agent.

12. The foam reducing apparatus of claim 11, said porous medium being a nonwoven polymer.

13. The foam reducing apparatus of claim 11, said porous medium being a woven material.

14. The foam reducing apparatus of claim 11, said anti-foam agent being a silicone.

* * * * *